United States Patent
Rafique et al.

(10) Patent No.: US 9,875,139 B2
(45) Date of Patent: Jan. 23, 2018

(54) GRAPHICS PROCESSING UNIT CONTROLLER, HOST SYSTEM, AND METHODS

(75) Inventors: Muhammad Mustafa Rafique, Doha (QA); Mohamed Hefeeda, Doha (QA); Khaled M. Diab Diab, Doha (QA)

(73) Assignee: Qatar Foundation, Doha (QA)

( * ) Notice: Subject to any disclaimer, the term of this patent is extended or adjusted under 35 U.S.C. 154(b) by 106 days.

(21) Appl. No.: 14/399,408

(22) PCT Filed: May 29, 2012

(86) PCT No.: PCT/EP2012/059985
§ 371 (c)(1),
(2), (4) Date: Nov. 6, 2014

(87) PCT Pub. No.: WO2013/178245
PCT Pub. Date: Dec. 5, 2013

(65) Prior Publication Data
US 2015/0128136 A1    May 7, 2015

(51) Int. Cl.
*G06F 9/50*    (2006.01)
*G06T 1/20*    (2006.01)
(Continued)

(52) U.S. Cl.
CPC .......... *G06F 9/5005* (2013.01); *G06F 9/5038* (2013.01); *G06F 9/5055* (2013.01);
(Continued)

(58) Field of Classification Search
CPC ................................. G06F 9/52; G06T 15/005
See application file for complete search history.

(56) References Cited

U.S. PATENT DOCUMENTS

| 8,266,289 B2 * | 9/2012 | Saha | G06F 9/5027 700/99 |
| 2007/0091089 A1 * | 4/2007 | Jiao | G06T 15/80 345/426 |

(Continued)

FOREIGN PATENT DOCUMENTS

WO    WO 2013/178245 A1    5/2013

OTHER PUBLICATIONS

Gupta, Vishakha, et al. "Pegasus: coordinated scheduling for virtualized accelerator-based systems." 2011. USENIX Annual Technical Conference (USENIX ATC'11).*

(Continued)

*Primary Examiner* — Lewis A Bullock, Jr.
*Assistant Examiner* — Gilles Kepnang
(74) *Attorney, Agent, or Firm* — Martin & Ferraro, LLP (57) ABSTRACT

A graphics processing unit controller configured to be communicatively coupled to one or more graphics processing units and one or more virtual machines, comprising: a unit collection module which is configured to store information regarding the available resources of one or more graphics processing units; and a scheduler module configured to allocate at least part of the one or more graphics processing units to the execution of a compute kernel in response to receipt of a request for the execution of the compute kernel, wherein the scheduler is configured to allocate at least part of the one or more graphics processing units based on a comparison between the available resources of the one or more graphics processing units and required resources for the execution of the compute kernel.

19 Claims, 2 Drawing Sheets

(51) Int. Cl.
*G06F 9/455* (2006.01)
*G06F 9/38* (2006.01)

(52) U.S. Cl.
CPC .............. *G06F 9/5077* (2013.01); *G06T 1/20* (2013.01); *G06F 9/3851* (2013.01); *G06F 9/45533* (2013.01); *G06F 2209/5021* (2013.01)

(56) References Cited

U.S. PATENT DOCUMENTS

| | | | | |
|---|---|---|---|---|
| 2009/0251476 | A1* | 10/2009 | Jiao | G06F 9/383 345/543 |
| 2009/0307704 | A1* | 12/2009 | Munshi | G06F 9/4843 718/104 |
| 2010/0110083 | A1* | 5/2010 | Paltashev | G06F 9/30072 345/506 |
| 2011/0010721 | A1* | 1/2011 | Gupta | G06F 9/5077 718/103 |
| 2011/0102443 | A1* | 5/2011 | Dror | G06T 1/20 345/522 |
| 2012/0144104 | A1* | 6/2012 | Gibney | G06F 13/1626 711/105 |
| 2012/0159464 | A1* | 6/2012 | Demetriou | G06F 8/45 717/148 |
| 2012/0206463 | A1* | 8/2012 | Reid | G06F 9/5027 345/503 |
| 2012/0297163 | A1* | 11/2012 | Breternitz | G06F 9/5066 712/22 |
| 2013/0155080 | A1* | 6/2013 | Nordlund | G06T 15/005 345/522 |
| 2013/0160016 | A1* | 6/2013 | Gummaraju | G06F 9/5044 718/102 |
| 2013/0191612 | A1* | 7/2013 | Li | G06T 15/005 712/30 |
| 2013/0222402 | A1* | 8/2013 | Peterson | G06F 9/52 345/520 |
| 2013/0305252 | A1* | 11/2013 | Venkataraman | G06F 3/0653 718/103 |
| 2015/0135183 | A1* | 5/2015 | Kipp | G06F 9/46 718/103 |

OTHER PUBLICATIONS

U.S. Appl. No. 61/589,447, filed Jan. 23, 2012. Li, Cheng-Hong et al. "Interference-driven Scheduling and Resource Management for GPU-based Heterogeneous Clusters".*

Augonnet et al., "StarPU: A Unified Platform for Task Scheduling on Heterogeneous Multicore Architectures," Euro-Par 2009 Parallel Processing, Aug. 25, 2009 Springer Berlin Heidelberg, ISBN 978-3-642-03868-6, ISBN 3-642-03868-9, vol. 5704, pp. 863-874, Aug. 2009, 12 pgs.

Giunta et al., "A GPGPU Transparent Virtualization Component for High Performance Computing Clouds," Radio Frequency Identification, Lecture Notes in Computer Science, Aug. 31, 2010 Springer Berlin Heidelberg, ISSN 0302-9743, ISBN 978-3-642-45283-3, ISBN 3-642-45283-3, vol. 6271, pp. 379-391. Aug. 2010, 13 pgs.

Montella et al., "A General-Purpose Virtualization Service for HPC on Cloud Computing: An Application to GPUs," Field Programmable Logic and Application, Lecture Notes in Computer Science, Jan. 1, 2012 Springer Berlin Heidelberg, ISSN 0302-9743, ISBN 978-3-540-45234-8, ISBN 540452344, vol. 7203, pp. 740-749, Jan. 2012, 10 pgs.

Rafique et al., "Symphony: A Scheduler for Client-Server Applications on Coprocessor-Based Heterogeneous Clusters." Cluster Computing (Cluster), 2011 IEEE International Conference on, Sep. 26, 2011 IEEE, ISBN 978-1-4577-1355-2, ISBN 1-4577-1355-1, pp. 353-362, Sep. 2011, 10 pgs.

Ravi et al., "Scheduling Concurrent Applications on a Cluster of CPU-GPU Nodes," 2012 12th IEEE/ACM International Symposium on Cluster, Cloud and Grid Computing (ccgrid 2012), May 1, 2012; May 13, 2012-May 16, 2012, ISBN 9780-7695-4691-9, ISBN 76954691X, pp. 140-147, May 2012, 8 pgs.

Ravi et al., "Supporting GPU Sharing in Cloud Environments with a Transparent Runtime Consolidation Framework," 20th ACM International Symposium on High-Performance Parallel and Distributed Computing, HPDC'l 1, Jun. 11, 2011—ISBN 978-1-4503-0552-5, ISBN 450305529, pp. 217-228, Jun. 2011, 12 pgs.

Shi et al, "vCUDA: GPU-Accelerated High-Performance Computing in Virtual Machines," IEEE Transactions on Computers, Jun. 1, 2012, vol. 61, No. 6, pp. 804-816, Jun. 2012, 13 pgs.

Wang et al., "Exploiting Concurrent Kernel Execution on Graphic Processing Units," High Performance Computing and Simulation (HPCS), 2011 International Conference on, Jul. 4, 2011 IEEE, ISBN 978-1-61284-380-3, ISBN 1-61284-380-8, pp. 24-32, Jul. 2011, 9 pgs.

Wu et al., "Dynamic Kernel/Device Mapping Strategies for GPU-assisted HPC Systems," 16th Workshop on Job Scheduling Strategies for Parallel Processing, Shanghai, China, May 25, 2012, May 2012, 18 pgs.

Gupta et al., "GViM: GPU-accelerated Virtual Machines," HPGVirt'09, 3rd Workshop on System-Level Virtualization for High Performance Computing, Mar. 31, 2009 ACM, ISBN 978-1-60558-465-2, ISBN 1-60558-4657, NR. 3, pp. 17-24.

International Search Report and Written Opinion for WO 2013/178245, International Application No. PCT/EP2012/059985, dated Oct. 24, 2012, 16 pages.

Li et al., "Accelerated high-performance computing through efficient multi-process GPU resource sharing," CF '12—Proceedings of the ACM Computing Frontiers Conference, May 17, 2012.

Li et al., "GPU Resource Sharing and Virtualization on High Performance Computing Systems," 2011 International Conference on Parallel Processing Sep. 1, 2011, Sep. 13, 2011-Sep. 16, 2011 IEEE, ISBN 978-1-4577-1336-1, ISBN 45771336X, pp. 733-742.

Merrit et al., "Shadowfax: Scaling in heterogeneous cluster systems via GPGPU assemblies," 5th International Workshop on Virtualization Technologies in Distributed Computing, VTDC'11, Jun. 8, 2011, pp. 3-10.

* cited by examiner

FIG. 1

GRAPHICS PROCESSING UNIT CONTROLLER, HOST SYSTEM, AND METHODS

This is a National Phase Application under 35 USC 371 of PCT/EP2012/059985 filed May 29, 2012 (published on Dec. 5, 2013 as WO 2013/178245), which is incorporated herein by reference.

DESCRIPTION OF INVENTION

The present invention relates to a graphics processing unit controller, host system, and corresponding methods. In particular, embodiments of the present invention relate to systems and methods for sharing graphics processing units or parts thereof.

The popularity of remote computing resources is increasing. Large computing facilities including a large number of processing units make their resources available for scientific and enterprise purposes. This allows users to access significant resources in an on-demand manner without the overheads associated with permanently maintaining such resources. These facilities are particularly useful, therefore, for users who only require such resources occasionally or whose requirements vary significantly over time.

A managing system for such facilities operates to allocate resources to applications so that each application has sufficient resources to run.

An example of a facility of this type is a cloud computing facility—of which there are now many commercial operators who rent processing resources to users so that computationally intensive applications can take advantage resources which would otherwise be unavailable or very expensive to maintain.

Within such facilities the use of graphics processing units (GPUs) is increasing. GPUs are co-processors which provide a high compute density at a relatively low cost. Modern GPUs also now use advanced processor architectures allowing a degree of parallel processing—for example.

An application may, for example, accelerate its computation by directing compute kernels to a GPU. A GPU is typically exclusively allocated to a particular virtual machine for the entire duration of the instance of the virtual machine. Operators of facilities will generally charge the user for the use of the GPU for the entire allocated period even if the GPU is only used (or only partly used) for a small part of the allocated period.

This is a disadvantage not only for the user (who must pay for resources which are underutilised) but also for the operator of the facility who must provide more GPUs than might otherwise be needed if GPU resources could be more readily shared.

Even modern GPUs have a number of limitations which present obstacles to their wide scale use in facilities in which the sharing of resources between multiple concurrent applications is required.

In particular, current GPUs share resources between applications in a serial manner—with an application being forced to wait whilst already scheduled compute kernels are completed before the application can be executed. This is due to the Single Instruction, Multiple Data architecture of GPUs which means that conventional GPU drivers do not combine compute kernels from different applications for concurrent execution.

There is, therefore, a need to ameliorate one or more problems associated with the prior art and provide systems and methods to share GPU resources more readily between multiple applications.

Accordingly, an aspect of the invention provides a graphics processing unit controller configured to be communicatively coupled to one or more graphics processing units and one or more virtual machines, comprising: a unit collection module which is configured to store information regarding the available resources of one or more graphics processing units; and a scheduler module configured to allocate at least part of the one or more graphics processing units to the execution of a compute kernel in response to receipt of a request for the execution of the compute kernel, wherein the scheduler is configured to allocate at least part of the one or more graphics processing units based on a comparison between the available resources of the one or more graphics processing units and required resources for the execution of the compute kernel.

The controller may further comprise a registry manager module which is configured to store information regarding the compute kernel including information regarding one or more required resources for the execution of the compute kernel.

The resource requirement may be a memory requirement.

The scheduler may be configured to disregard a graphics processing unit in the allocation process if the graphics processing unit does not have sufficient memory to meet the resource requirement for the execution of the compute kernel.

The memory requirement may include a memory access instance or duration, and the available resources of the or each graphics processing unit includes a memory access instance or duration of a compute kernel already being executed by the graphics processing unit.

The scheduler module may be configured to allocate at least part of the one or more graphics processing units to the execution of a compute kernel based on a determination of an interference measure between the compute kernel and one or more compute kernels already being executed by the or each graphics processing unit.

The interference measure may include a likelihood of a conflict for a shared resource between the execution of the compute kernel and the execution of another compute kernel.

The shared resource may be a global memory, and/or a communications interface.

Another aspect of the present invention provides a host system including a controller.

The host system may further comprise a plurality of graphics processing units.

The host system may further comprise one or more computing devices which are configured to provide one or more virtual machines.

The host system may further comprise an interface which is configured to receive communications from a remote client system.

The interface may include an internet connection.

The host system may be a cloud computing facility.

Another aspect of the present invention provides a method of allocating at least part of one or more graphics processing units to the execution of a compute kernel, the method comprising: storing, in a unit collection module, information regarding the available resources of one or more graphics processing units; and allocating, using a scheduler module, at least part of the one or more graphics processing units to the execution of a compute kernel in response to receipt of a request for the execution of the compute kernel, wherein the scheduler is configured to allocate at least part of the one or more graphics processing units based on a comparison between the available resources of the one or more graphics processing units and required resources for the execution of the compute kernel.

The method may further comprise storing, in a registry manager module, information regarding the compute kernel including information regarding one or more required resources for the execution of the compute kernel.

The resource requirement may be a memory requirement.

The step of allocating may include disregarding a graphics processing unit if the graphics processing unit does not have sufficient memory to meet the resource requirement for the execution of the compute kernel.

The memory requirement may include a memory access instance or duration, and the available resources of the or each graphics processing unit includes a memory access instance or duration of a compute kernel already being executed by the graphics processing unit.

The allocating step may include allocating at least part of the one or more graphics processing units to the execution of a compute kernel based on a determination of an interference measure between the compute kernel and one or more compute kernels already being executed by the or each graphics processing unit.

The interference measure may include a likelihood of a conflict for a shared resource between the execution of the compute kernel and the execution of another compute kernel.

Aspects of embodiments of the present invention are described, by way of example only, with reference to the accompanying drawings in which.

Figure 1:
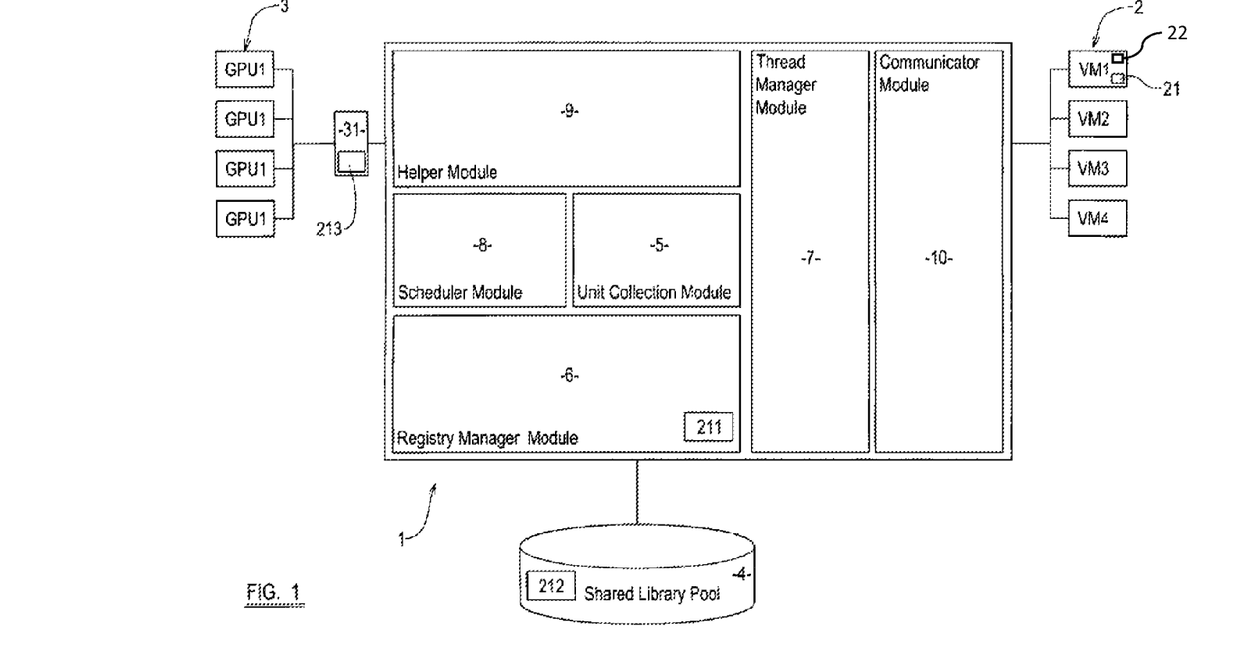
FIG. 1 shows a high-level system architecture for a GPU controller.
Figure 2:
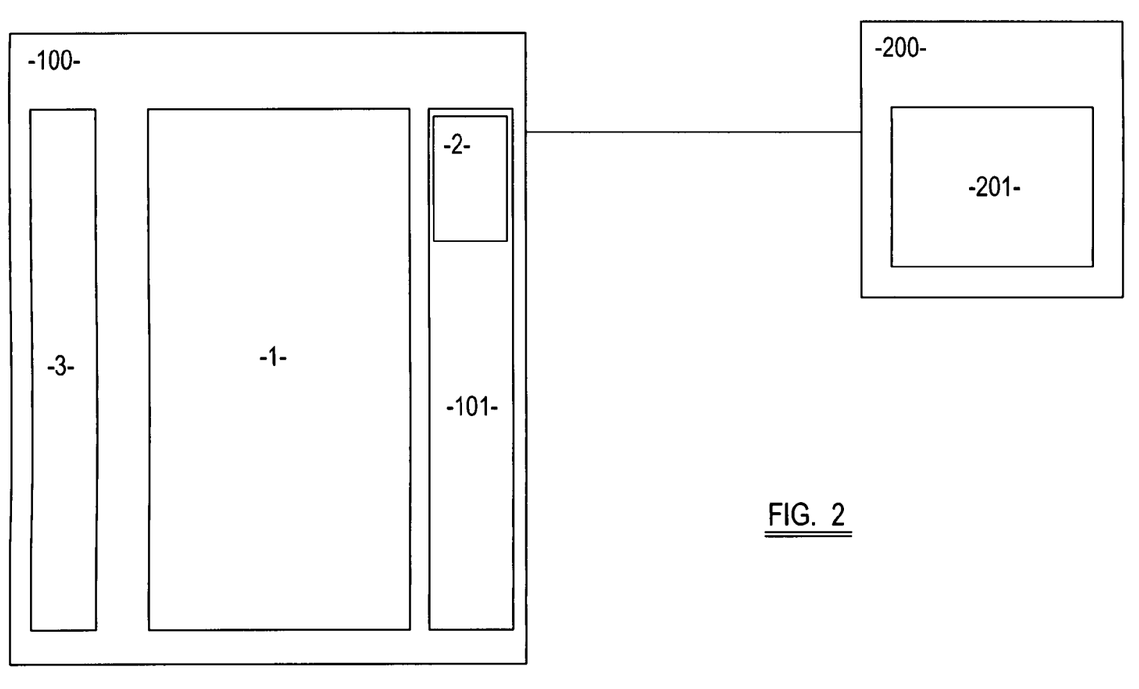
FIG. 2 shows a host and client system arrangement.

With references to FIGS. 1 and 2, a graphics processing unit controller 1 is communicatively coupled to one or more virtual machines 2 (VM1, VM2, VM3 ... VMN) and one or more graphics processing units 3 (GPU1, GPU2, GPU3 ... GPUK).

The or each graphics processing unit 3 is configured to execute one or more compute kernels 21 for an application 22 of one of the one or more virtual machines 2, and to return the results of the execution of the or each compute kernel 21 to the one of the one or more virtual machines 2. As will be appreciated, in accordance with embodiments, the or each graphic processing unit 3 may be configured to execute a plurality of compute kernels 21 for a plurality of applications 22 of one or more of the virtual machines 2.

The graphics processing unit controller 1 is communicatively coupled between the one or more virtual machines 2 and the one or more graphics processing units 3, such that the graphics processing unit controller 1 is configured to manage the allocation of one or more compute kernels 21 to the or each graphics processing unit 3. In other words, the graphics processing unit controller 1 is configured to allocate the resources of one or more graphics processing units 3 to a compute kernel 21.

Allocation of resource may include scheduling of the execution of the compute kernel 21 —in other words, the allocation may be for a predetermined time period or slot.

In embodiments, the graphics processing unit controller 1 is also configured to manage the execution of the or each compute kernel 21 by the one or more graphics processing units 3.

In embodiments, the graphics processing unit controller 1 is further configured to manage the return of the results of the execution of the or each compute kernel 21 to the one of the one or more virtual machines 2.

As shown in FIG. 1, the graphics processing unit controller 1 may include one or more of: a unit collection module 5, a registry manager module 6, a thread manager module 7, a scheduler module 8, a helper module 9, and a communicator module 10.

The graphics processing unit controller 1 may also include a shared library pool 4. In embodiments, the shared library pool 4 is a computer readable storage medium communicatively coupled to, but remote from, the graphics processing unit controller 1. The computer readable medium may be a non-volatile storage medium.

The role of each of the components of the graphics processing unit controller 1 is described below, by way of example, with reference to an example in which an application on a first virtual machine 2 (e.g. VM1) of the one or more virtual machines 2 requires the execution of a first compute kernel 21 by a graphics processing unit 3.

On the instantiation of the first virtual machine 2 (e.g. VM1) or the loading of the application 22 by the first virtual machine 2 (e.g. VM1), the first virtual machine 2 (e.g. VM1) issues a request to the graphics processing unit controller 1 to register the first compute kernel 21.

Within the graphics processing unit controller 1, the communications between the or each virtual machine 2 and the graphics processing unit controller 1 are handled and managed by the communicator module 10.

The communicator module 10 may include one or more input and output buffers, as well as addressing information and the like to ensure that communications from the graphics processing unit controller 1 are directed to the desired virtual machine 2 of the one or more virtual machines 2.

In embodiments, the communicator module 10 includes a plurality of communicator sub-modules which may each be configured to handle and manage communications between a different one of the one or more virtual machines 2 and the graphics processing unit controller 1. The communicator module 10 may be further configured to communicate with parts of a host system 100 of the graphics processing unit controller 1 and/or a client system 200.

Accordingly, the request from the first virtual machine 2 (e.g. VM1) is received and handled by the communicator module 10 of the graphics processing unit controller 1.

The graphics processing unit controller 1 registers the first compute kernel 21 and stores the first compute kernel 21 along with metadata in a shared library pool 4 which is part of or coupled to the graphics processing unit controller 1. The metadata may associate the first compute kernel 21 with the first virtual machine 2 (e.g. VM1) and/or the application 22 running on the first virtual machine 2 (e.g. VM1)—for example. In examples, the metadata comprises sufficient information to identify the first compute kernel 21 from among a plurality of compute kernels 21 (e.g. an identifier which is unique or substantially unique).

This registering of the first compute kernel 21 may be performed, at least in part, by the registry manager module 6 which receives data via the communicator module 10 from the first virtual machine VM1.

The registry manager module 6 stores a list of one or more registered compute kernels 211. The list includes, for the or each registered compute kernel 211, information which allows the compute kernel 21 to be identified and the results of the or each executed compute kernel 21 to be returned to the requesting virtual machine of the one or more virtual machines 2.

Accordingly, the list may include, for the or each registered compute kernel 211, one or more of: a requesting virtual machine identifier, an application identifier (identifying the application 22 of the requesting virtual machine 2 (e.g. VM1) which is associated with the compute kernel 21), a library identifier (which identifies the location 212 of the compute kernel 21 in the shared library pool 4), an identifier for the compute kernel 21, timing information for the compute kernel 21, resource requirements of the execution of the compute kernel 21, and required arguments for the execution of the compute kernel 21.

The metadata which is stored in the shared library pool 4 may comprise some or all of the data from the list for the or each registered compute kernel 211.

As will be appreciated, some of the information which is stored in the list (and/or metadata) is information which is obtained from the relevant one of the one or more virtual machines 2 (e.g. VM1). However, some of the data may be determined by a part of the graphics processing unit controller 1 (e.g. by the communicator module 10)—which may, for example, forward an application identifier or a virtual machine identifier to the shared library pool 4 and/or the registry manager module 6 for storage therein.

The registering of the first compute kernel 21 may be assisted or at least partially performed by the use of one or more sub-modules of the helper module 9. The sub-modules may, for example, manage or provide information regarding the storage format for the compute kernel 21 and/or metadata in the shared library pool 4. The sub-modules may, for example, include one or more modules which manage the addition or removal of entries in the list of registered compute kernels 211 in the registry manager module 6.

When the application 22 operating on the first virtual machine 2 (e.g. VM1) wants the first compute kernel 21 to be executed, then the first virtual machine 2 (e.g. VM1) sends a request to the graphics processing unit controller 1; the request includes sufficient information for the graphics processing unit controller 1 to identify the first compute kernel within the shared library pool 4 (which may store a plurality of compute kernels 21).

The graphics processing unit controller 1 is configured to receive the request from the first virtual machine 2 (e.g. VM1) and use the information included in the request to identify the first compute kernel 21 within the shared library pool 4.

The graphics processing unit controller 1 then loads the first compute kernel 21 from the location 212 in the shared library pool 4.

More specifically, in embodiments, the execution request from the application 22 of the first virtual machine VM1 is received by the communicator module 10 which, as discussed above, handles or otherwise manages communications between the graphics processing unit controller 1 and the or each virtual machine 2.

The execution request is then intercepted by the thread manager module 7 (if provided) which allocates one or more idle threads to the execution of the first compute kernel 21. Each thread of a pool of threads managed by the thread manager module 7 has access to a graphics processing unit context for the or each graphics processing unit 3 provided by the unit collection module 5—see below.

The information included in the received execution request from the first virtual machine 2 (e.g. VM1) is compared to information in the registry manager module 6 in order to identify the first compute kernel 21 from amongst the registered compute kernels 211 (of which there might, of course, only be one, although there will usually be a plurality). This may be achieved by, for example, comparing information (such as a virtual machine identifier, and/or an application identifier, and/or an identifier for the compute kernel 21, for example) with corresponding information stored in the registry manager module 6.

Searching of the registry manager module 6 may be assisted or performed, in embodiments, by a sub-module of the helper module 9.

Once the first compute kernel 21 has been identified from the list of the registry manager module 6, then the library identifier for the first compute kernel 21 is retrieved from the list—or other information which allows the first compute kernel 21 to be loaded from the location 212 in the shared library pool 4.

In embodiments, using the information stored in the registry manager module 6, the first compute kernel 21 is loaded from the shared library pool 4 into a memory 31 which can be accessed by the or each graphics processing unit 3. This may be memory 31 associated with a particular one of the one or more graphics processing units 3 (which may be accessible only by that one graphics processing unit 3) or may be memory 31 which is accessible by more than one of a plurality of the graphics processing units 3. A pointer to the start of the loaded first compute kernel 213 (which will be the start of a function of the loaded first compute kernel 213) is determined. This pointer is then sent to a graphics processing unit 3 (e.g. GPU1) of the one or more graphics processing units 3—the graphics processing unit 3 (e.g. GPU1) to which the pointer is sent may be the graphics processing unit 3 with which the memory 31 is associated.

Which graphics processing unit 3 (e.g. GPU1)—or part thereof—executes the loaded first compute kernel 213 is determined by the graphics processing unit controller 1 based, for example, on the available resources of the one or more graphics processing units 3. It will be appreciated that, during normal operation, there will be at least one other compute kernel being executed by the one or more graphics processing units 3 (e.g. GPU1).

More specifically, in embodiments, the unit collection module 5 stores a record for each of the one or more graphics processing units 3. In embodiments, the record comprises a logical object through which access to the associated graphics processing unit 3 can be made. The record may include, for the associated graphics processing unit 3, one or more of: a unit compute capability, a unit ordinal, a unit identifier (i.e. name), a total unit memory, a total unit available memory, one or more physical addresses for the unit's memory 31, other resource availability for the graphics processing unit 3, and the like. Each record is used to generate a graphics processing unit context for the or each of the graphics processing units 3.

In embodiments, the unit collection module 5 may also maintain a record of each of the one or more graphics processing units 3 on a more granular scale. For example, each record may include information regarding the or each core, of group of cores, which may form part of the graphics processing unit 3 (e.g. GPU1). This information may include information regarding the availability of the or each core or group of cores.

The scheduler module 8 is configured to receive information about the registered first compute kernel 211 from the registry manager module 6 along with information about available resources of the one or more graphics processing units 3 (or parts thereof) from the unit collection module 5.

The scheduler module 8 uses the information about the registered first compute kernel 211 to determine what resources will be needed in order to execute the first compute kernel 21. The scheduler module 8 is configured to compare the required resources with the available resources and allocate the first compute kernel 21 to at least one (e.g. GPU1) of the one or more graphics processing units 3 (or a part thereof).

In other words, the scheduler module 8 is configured to allocate resources of one or more graphics processing units 3 (or a part thereof) to the execution of the first compute kernel 21. In the event that a particular graphics processing unit 3 (e.g. GPU1) has more available resources than the required resources for execution of the first compute kernel 21, then only a subset of the available resources is allocated.

The allocation of graphics processing unit 3 resources to a compute kernel 21 and the selection of a graphics processing unit 3 (or part thereof) to execute a particular compute kernel 21 is discussed below.

The scheduler module 8 is configured, after allocation of resources, to output an identifier for the allocated resources—such as an identifier for the graphics processing unit 3 (e.g. GPU1) (or part thereof) which has been allocated. This may be passed to, for example, the unit collection module 5. The unit collection module 5 may update any records associated with the selected graphics processing unit 3 (e.g. GPU1) in light of the newly allocated resource of that unit 3 (e.g. GPU1).

When the execution of the first compute kernel 21 is complete, then the results are returned by the graphics processing unit (e.g. GPU1), to the first virtual machine 2 (e.g. VM1).

In embodiments, this returning of the results occurs via the graphics processing unit controller 1 which receives the results and identifies the virtual machine 2 (e.g. VM1) of the one or more virtual machines 2 which requested execution of the first compute kernel 21. This identification may be achieved in any of several different manners. For example, the graphics processing unit controller 1 may consult the registry manager module 6 to identify the first compute kernel 21 from the registered compute kernels 211 (using information about the identity of the first compute kernel 21 returned with the results) and, therefore, an identifier for the first virtual machine 2 (e.g. VM1) and/or an application identifier from the information stored in the registry manager module 6. In another embodiment, information to identify the first virtual machine 2 (e.g. VM1) and/or requesting application 22, may be returned by the graphics processing unit 3 (e.g. GPU1) with the results. This may include a virtual machine identifier and/or an application identifier, or pointers to the location of the same in the shared library pool 4—for example. In embodiments, the unit collection module 5 stores a record of the virtual machine 2 and/or application 22 whose compute kernel is currently using resources of a particular graphics processing unit 3 (e.g. GPU1) of the one or more graphics processing units 3.

Once the first virtual machine 2 (e.g. VM1) (as the requester in this example) has been identified, then the results are returned, in such embodiments, by the graphics processing unit controller 1 to the first virtual machine 1.

The identification of the first virtual machine 2 (e.g. VM1) (i.e. the requestor) and the returning of the results may be assisted or handled by one or more sub-modules of the helper module 9.

As will be appreciated, in practice, the graphics processing unit controller 1 will be managing the execution of a large number of compute kernels 21 at any one time during typical operation.

The scheduler module 8 must, therefore, be configured so as to handle the allocation of resources to a plurality of compute kernels 21.

This may be achieved by the use of a hierarchy of rules.

In embodiments, the scheduler module 8 is, in the first instance, configured to allocate resources on the basis of an identification of the best available graphics processing unit 3 of the one or more graphics processing units 3.

Accordingly, the scheduler module 8 may be configured to analyse the record for the or each graphics processing units 3 (or parts thereof) as stored in the unit collection module 5. The scheduler module 8 is, in this example, configured to compare the memory requirements of the compute kernel 21 with the available memory resources of the or each graphics processing unit 3 which are not currently executing a loaded compute kernel 213 using the stored records.

If a graphics processing unit 3 has free memory which greater than or equal to the memory requirement of the compute kernel 21, then that graphics processing unit 3 is selected and the record for the next graphics processing unit 3 is analysed. Selection may comprise the storing of an identifier for the graphics processing unit 3.

If a subsequently analysed record identifies a graphics processing unit 3 which has more free memory than the selected graphics processing unit 3 (or is otherwise preferred to the currently selected graphics processing unit 3), then that graphics processing unit 3 is selected instead. Thus, the best available (i.e. free) graphics processing unit 3 is selected from the one or more graphics processing units 3.

In the event that none of the one or more graphics processing units 3 identified in the records stored by the unit collection module 5 are free, then the scheduler module 8 queues the compute kernel 21 for later execution when one or more of the currently executing compute kernels 21 has completed its execution. At that later time, the scheduler module 8 may re-apply the above analysis process—generally referred to herein as the best free unit method. The later time may be a substantially random time, or may be triggered by the completion of the execution of one or more compute kernels 21.

The unit collection module 5 may, for example, be configured to inform the scheduler module 8 when one or more of the currently executing compute kernels 21 has completed its execution and now has more available resources.

As will be appreciated, the allocation of the best free unit in accordance with the above method may result in under-utilisation of the available resources because only free units 3 are considered for allocation to the compute kernel 21.

Another method which may be applied by the scheduler module 8 is referred to herein as the best unit method.

In accordance with the best unit method, the scheduler module 8 analyses the records not only of the free graphics processing units 3 but also of those graphics processing units 3 which are already executing a loaded compute kernel 213 or have been otherwise allocated to a compute kernel 21.

The available (i.e. free) memory of the or each graphics processing unit 3 is compared to the memory requirement for the compute kernel 21 which is awaiting execution. If the available memory of a graphics processing unit 3 is greater than or equal to the memory requirement, then an identifier for the graphics processing unit 3 is placed in a possibles list.

Once all of the records for all of the one or more graphics processing units 3 have been analysed, then the possibles list is sorted in order of available memory capacity such that the identifier for the graphics processing unit 3 with the least available memory is at the top of the list. The graphics processing unit 3 whose identifier is at the top of the list is then selected and the required available resources of that graphics processing unit 3 are allocated to the compute kernel for execution thereof. Equally, of course, instead of compiling and then sorting a possibles list, a selection could be made and then replaced if a subsequently analysed record for a particular graphics processing unit 3 indicates that another graphics processing unit 3 has less available memory than the currently selected graphics processing unit 3 (but still sufficient available memory for the execution of the compute kernel 21).

Again, if the records indicate that no graphics processing units 3 have sufficient memory to execute the compute kernel 21 then the scheduler module 8 will queue the compute kernel 21 for execution at a later time—in much the same manner as described above.

Allocation of resources may include the allocation of one or more available cores (or other parts) of the selected graphics processing unit 3.

Another method which may be applied by the scheduler module 8 is referred to herein as the minimum interference method. In accordance with this method, the scheduler module 8 determines the requirements for a compute kernel 21 to access one or more shared resources. These shared resources may include, for example, a shared (i.e. global) memory resource, a network communication interface, or any other input/output interface or hardware resource which may be shared by two or more executing compute kernels 21.

The scheduler module 8 may obtain this information from the unit collection module 5 or may determine the information by analysis of the first compute 21 kernel—which may include executing the first compute kernel 21 or a part thereof.

The requirements for access to one or more shared resources are then compared to the corresponding requirements of one or more compute kernels 21 which are already being executed.

The degree to which a conflict is likely to occur is determined as a result of the comparison. This degree of likely conflict may be, for example, a ratio of an expected number of shared memory accesses which will be made by the compute kernel 21 (or kernels 21) currently using the shared resource and the compute kernel 21 waiting to be executed, a ratio of an expected volume of data to be accessed from shared memory by the compute kernel 21 (or kernels 21) currently using the shared resource and the compute kernel 21 waiting to be executed, a ratio of a number or expected duration of network interface uses by the compute kernel 21 (or kernels 21) currently using the shared resource and the compute kernel 21 waiting to be executed, or the like.

In embodiments, the likelihood of interference (or conflict) takes into account the patterns of usage of the shared resources by the currently executing compute kernel 21 (or kernels 21) and the compute kernel 21 waiting to be executed. Thus, a particular compute kernel 21 may have a lower risk of interference with another compute kernel 21 if the requests for a shared resource are interleaved (i.e. generally do not occur at the same time).

In embodiments, the likelihood of interference is determined based on the usage of a number of different shared resources.

A list is generated by the scheduler module 8 of the graphics processing units 3 which are able to execute the compute kernel 21 which is awaiting execution and the respective likelihood of interference between the currently executing compute kernels 21 and the compute kernel 21 awaiting execution. The list may indicate the graphics processing units 3 by use of identifiers.

Those graphics processing units 3 which are able to execute the compute kernel 21 are those with available memory resources which are equal to or exceed the memory requirements for the compute kernel 21 awaiting execution.

Once all of the records for the or each graphics processing units 3 have been analysed, then the list may be sorted to identify the graphics processing unit whose use entails the lowest likelihood of interference and to order the other graphics processing units 3 (if any) in ascending order of the likelihood of interference.

The graphics processing unit 3 whose identifier is at the top of the list is then selected and the required available resources of that graphics processing unit 3 are allocated to the compute kernel 21 for execution thereof. Equally, of course, instead of compiling and then sorting a possibles list, a selection could be made and then replaced if a subsequently analysed record for a particular graphics processing unit 3 indicates that another graphics processing unit 3 is less likely to have a shared resource conflict than the currently selected graphics processing unit 3.

Again, if the records indicate that no graphics processing units 3 have sufficient memory to execute the compute kernel 21 then the scheduler module 8 will queue the compute kernel 21 for execution at a later time—in much the same manner as described above.

As will be appreciated, allocation of resources may include the allocation of one or more available cores (or other parts) of the selected graphics processing unit 3.

It will be understood that in accordance with embodiments of the invention the same principles can be applied not only on a graphics processing unit scale but also in relation to the individual cores of each graphics processing unit 3.

In embodiments, a plurality of cores of one or more of the graphics processing units 3 are allocated to a particular compute kernel 21. In embodiments, a particular compute kernel 21 may be allocated a plurality of cores from more than one graphics processing unit 3. In such embodiments, it will be appreciated that the above described methods and apparatus are equally applicable. For example, the available resources for a graphics processing unit 3 may include the available resources for a core of a graphics processing unit 3.

It will be understood that a subset of one or more cores of the total number of cores of a graphics processing unit 3 constitutes a part of the graphics processing unit 3.

In embodiments, a host system 100 is a cloud computing system or facility which includes the or each graphics processing unit 3, the graphics processing unit controller 1, and one or more computing devices 101 on which the or each virtual machine 2 is provided. In embodiments the host system 100 includes a plurality of graphics processing unit controllers 1 each coupled to one or more graphics processing units 3.

A client system 200, in embodiments, comprises a computing device 201 of a user which is communicatively coupled to the host system 100 and which is configured to issue instructions to the host system 100. These instructions may include, for example, requests for the allocation of resources, requests for the execution of an application 22, and the like. The client system 200 may be configured to receive data from the host system 100 including the results of the execution of an application 22 by the host system 100 in response to an execution request by the client system 200.

It will be understood that the present invention is particularly useful in the operation of cloud computing networks and other distributed processing arrangements.

According to embodiments, the resources of graphics processing units 3 of a facility (e.g. a host system 100) may be more efficiently shared between applications 22.

The resources of a particular graphics processing unit 3 (or group thereof) may even be split between a plurality of applications 22, compute kernels 21, virtual machines 2, and/or users (i.e. client systems 200).

As will be appreciated, in accordance with embodiments of the invention, concurrent execution of a plurality of compute kernels 21 (or parts thereof) may be achieved on a single graphics processing unit 3.

The helper module 9 may include one or more sub-modules which are configured to assist with, or handle, file system interactions, the generation and management of graphics processing unit contexts, information regarding graphics processing units, interactions with graphics processing units 3, and the loading of data (e.g. a compute kernel).

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A graphics processing unit controller configured to be communicatively coupled to at least one graphics processing unit of a plurality of graphics processing units and at least one virtual machine, the graphics processing unit controller comprising:
 a processor configured to:
  store information regarding available shared resources of the graphics processing units;
  receive a request for execution of a compute kernel, wherein the compute kernel is scheduled to access one or more of the available shared resources;
  determine, for one or more of the graphics processing units, an interference measure indicating a likelihood of a conflict of the shared resources between the compute kernel and at least one compute kernel already being executed by a respective graphics processing unit, the interference measure being based on patterns of usage of the shared resources by the compute kernel and the at least one compute kernel already being executed by the respective graphics processing unit;
  generate a likelihood of interference list ordering the graphics processing units based on the interference measure between the compute kernel and the at least one compute kernel already being executed by the respective graphics processing unit, wherein the likelihood interference list is ordered from lowest risk of interference to highest risk of interference;
  determine whether the compute kernel can execute on the respective graphics processing unit, in response to the receipt of the request for the execution of the compute kernel and in sequence of the likelihood interference list, wherein the determining whether the compute kernel can execute on the respective graphics processing unit is based on a comparison between the available resources of the respective graphics unit and required resources for the execution of the compute kernel;
  allocate at least part of the respective graphics processing unit for the execution of the compute kernel if the respective graphics processing unit is determined to execute the compute kernel; and
  execute the compute kernel on the respective graphics processing unit, wherein the compute kernel accesses the available shared resources of the respective graphics processing unit.

2. A graphics processing unit controller according to claim 1, wherein the processor is further configured to store information regarding the compute kernel including information regarding the required resources for the execution of the compute kernel.

3. A graphics processing unit controller according to claim 1, wherein the required resources include a memory requirement.

4. A graphics processing unit controller according to claim 3, wherein the processor is further configured to disregard the respective processing unit if the respective graphics processing unit does not have sufficient memory to meet the memory requirement for the execution of the compute kernel.

5. A graphics processing unit controller according to claim 3, wherein the memory requirement includes a memory access instance or duration, and the available shared resources of the respective graphics processing unit includes a memory access instance or duration of the compute kernel already being executed by the respective graphics processing unit.

6. A graphics processing unit controller according to claim 1, wherein the interference measure is a lower risk of interference when the shared resources are interleaved between the compute kernel and the at least one compute kernel already being executed by the respective graphics processing unit.

7. A graphics processing unit controller according to claim 6, wherein the shared resource is one of a global memory and a communications interface.

8. A host system including a graphic processing unit controller, the host system comprising:
 at least one graphics processing unit of a plurality of graphics processing units;
 at least one virtual machine; and
 the graphics processing unit controller configured to be communicatively coupled to the at least one graphics processing unit and the at least one virtual machine, the graphics processing unit controller including:
  a processor configured to:
   store information regarding available shared resources of the graphics processing units;
   receive a request for execution of a compute kernel, wherein the compute kernel is scheduled to access one or more of the available shared resources;
   determine, for one or more of the graphics processing units, an interference measure indicating a likelihood of a conflict for the shared resources between the compute kernel and at least one compute kernel already being executed by a respective graphics processing unit, the interference measure being based on patterns of usage of the shared resources by the compute kernel and the at least one compute kernel already being executed by the respective graphics processing unit;

generate a likelihood of interference list ordering the graphics processing units based on the interference measure between the compute kernel and the at least one compute kernel already being executed by the respective graphics processing unit, wherein the likelihood interference list is ordered from lowest risk of interference to highest risk of interference;

determine whether the compute kernel can execute on the respective graphics processing unit, in response to the receipt of the request for the execution of the compute kernel and in sequence of the likelihood interference list, wherein the determining is based on a comparison between the available resources of the respective graphics unit and required resources for the execution of the compute kernel;

allocate at least part of the respective graphics processing unit for the execution of the compute kernel if the respective graphics processing unit is determined to execute the compute kernel; and execute the compute kernel on the respective graphics processing unit, wherein the compute kernel accesses the available shared resources of the respective graphics processing unit.

9. A host system according to claim 8, further comprising at least one computing device configured to provide the at least one virtual machine.

10. A host system according to claim 9, wherein the host system is a cloud computing facility.

11. A host system according to claim 8, further comprising an interface which is configured to receive communications from a remote client system.

12. A host system according to claim 11, wherein the interface includes an internet connection.

13. A host system according to claim 8, wherein the interference measure is a lower risk of interference when the shared resources are interleaved between the compute kernel and the at least one compute kernel already being executed by the respective graphics processing unit.

14. A method of allocating at least part of at least one graphics processing unit of a plurality of graphics processing units to execute a compute kernel, the method comprising:

storing, in a unit collection module, information regarding available shared resources of the graphics processing units;

receiving a request for execution of a compute kernel, wherein the compute kernel is scheduled to access one or more of the available shared resources;

determining, for one or more of the graphics processing units, an interference measure indicating a likelihood of a conflict for the shared resources between the compute kernel and at least one compute kernel already being executed by a respective graphics processing unit, the interference measure being based on patterns of usage of the shared resources by the compute kernel and the at least one compute kernel already being executed by the respective graphics processing unit;

generating a likelihood of interference list ordering the graphics processing units based on the interference measure between the compute kernel and the at least one compute kernel already being executed by the respective graphics processing unit, wherein the likelihood interference list is ordered from lowest risk of interference to highest risk of interference;

determining whether the compute kernel can execute on the respective graphics processing unit, in response to the receipt of the request for the execution of the compute kernel and in sequence of the likelihood interference list, wherein the determining is based on a comparison between the available resources of the respective graphics unit and required resources for the execution of the compute kernel;

allocating, using a scheduler module, the at least part of the respective graphics processing unit for the execution of the compute kernel if the respective graphics processing unit is determined to execute the compute kernel; and executing the compute kernel on the respective graphics processing unit, wherein the compute kernel accesses the available shared resources of the respective graphics processing unit.

15. A method according to claim 14, further comprising storing, in a registry manager module, information regarding the compute kernel including information regarding the required resources for the execution of the compute kernel.

16. A method according to claim 14, wherein the required resources include a memory requirement.

17. A method according to claim 16, further comprising disregarding, by the scheduler module, the respective graphics processing unit if the respective graphics processing unit does not have sufficient memory to meet the required resources for the execution of the compute kernel.

18. A method according to claim 16, wherein the memory requirement includes a memory access instance or duration, and the available resources of the respective graphics processing unit includes a memory access instance or duration of the at least one compute kernel already being executed by the respective graphics processing unit.

19. A method according to claim 14, wherein the interference measure is a lower risk of interference when the shared resources are interleaved between the compute kernel and the at least one compute kernel already being executed by the respective graphics processing unit.

* * * * *